United States Patent [19]

White et al.

[11] 4,361,488
[45] Nov. 30, 1982

[54] LIQUID SEPARATING AND RECYCLING

[75] Inventors: Harold R. White, New Lenox; Alexander J. Doncer, Jr., Palos Heights, both of Ill.

[73] Assignee: Alar Engineering Corporation, Chicago, Ill.

[21] Appl. No.: 215,060

[22] Filed: Dec. 10, 1980

[51] Int. Cl.³ .................. B01D 17/02; B01D 27/00
[52] U.S. Cl. .................... 210/776; 210/799; 210/804; 210/805; 210/168; 210/320; 210/DIG. 5; 210/538
[58] Field of Search ............ 210/242.3, 525, 776, 210/708, DIG. 5, 799, 168, 804–806, 538, 320, 744

[56] References Cited

U.S. PATENT DOCUMENTS

| | | | |
|---|---|---|---|
| 3,878,094 | 4/1975 | Conley et al. | 210/DIG. 5 |
| 3,972,816 | 8/1976 | Mail et al. | 210/DIG. 5 |
| 4,011,158 | 3/1977 | Cook | 210/DIG. 5 |
| 4,018,683 | 4/1977 | Walters et al. | 210/71 |
| 4,032,444 | 10/1977 | Wright et al. | 210/86 |
| 4,081,373 | 3/1978 | Rozniecki | 210/DIG. 5 |
| 4,111,806 | 7/1978 | Wright et al. | 210/115 |
| 4,151,087 | 4/1979 | Sakaguchi | 210/DIG. 5 |
| 4,162,973 | 7/1979 | Lynch | 210/DIG. 5 |
| 4,240,908 | 12/1980 | Swain et al. | 210/DIG. 5 |
| 4,290,887 | 9/1981 | Brown et al. | 210/525 |

OTHER PUBLICATIONS

Albany Felt Company brochure on "Kolar" coalescing cartridges with enclosed presentations at The Filtration Society Meeting, Apr. 15, 1975 entitled A Review of Basic Properties of Oil and the Practical Aspects of Oily Water Separation.
AMF Cuno brochure on "Zeta Plus Filter Media", No. ZP20.2 dated Oct. 11, 1976.
"Liquid Separator System", Allith Division Smith Jones, Inc.

Primary Examiner—Benoît Castel
Attorney, Agent, or Firm—Hill, Van Santen, Steadman, Chiara & Simpson

[57] ABSTRACT

Solid contaminants are removed from tramp oil containing aqueous emulsions, the emulsions are separated into reusable constituents and the separated aqueous liquid is recycled. Apparatus and method are provided especially for reclaiming solvents, washing solutions, lubricating oil, cutting oil and the like from installations for cleaning, quenching or washing oil coated stampings, parts, and the like. Dirt, grit, scale and the like contaminants are filtered out from used industrial cleaning solutions, the liquid components are coalesced into reusable constituents and the aqueous component is continuously recycled for re-use without loss of dissolved chemicals or consumption of energy for heating or cooling. The apparatus is compact, self-contained with a filter, an electric motor driven pump, and valved piping to be easily mounted adjacent and connected to industrial equipment without disturbing the equipment, operates with a minimum amount of energy and is serviced without interruption of the operation of the equipment.

18 Claims, 7 Drawing Figures

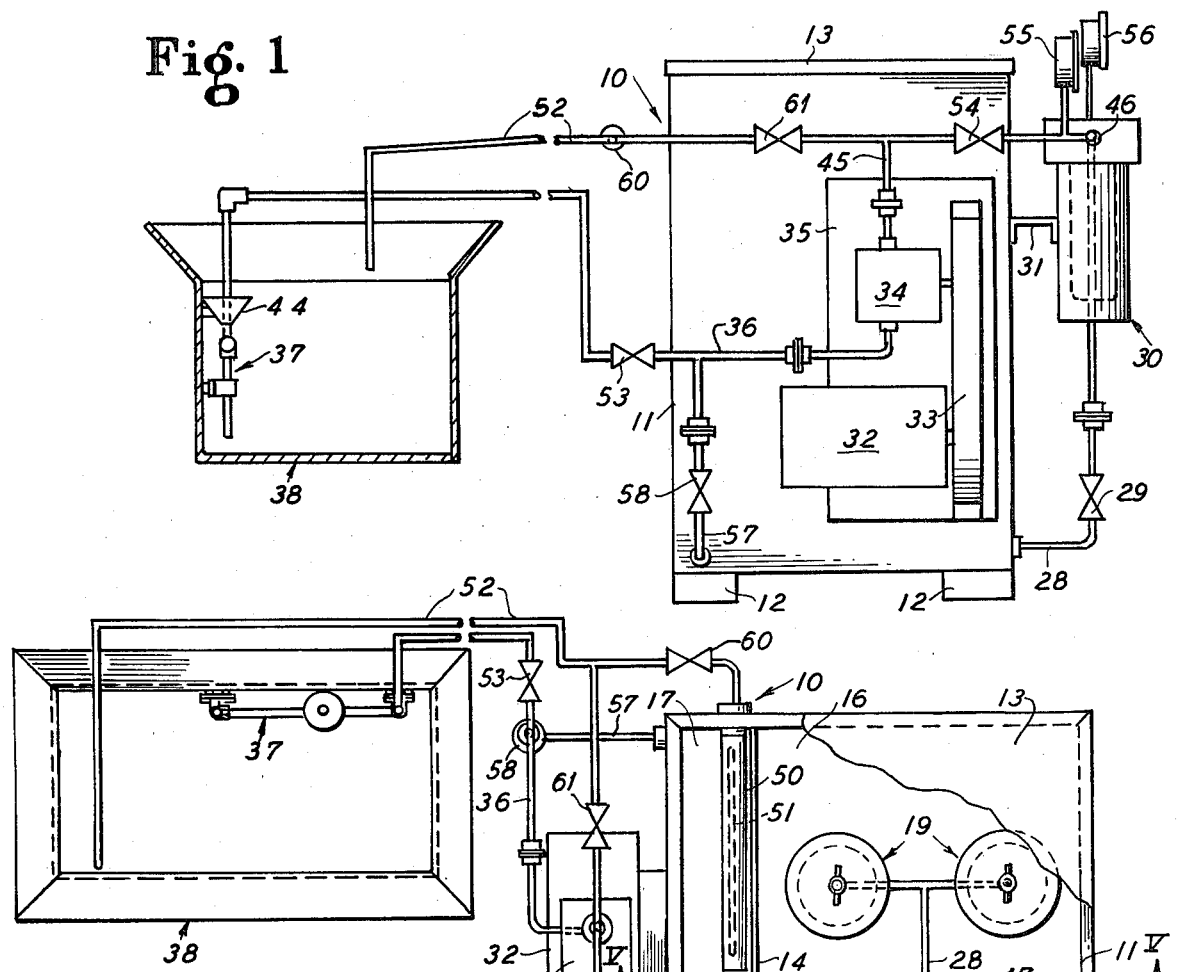
Fig. 1
Fig. 2
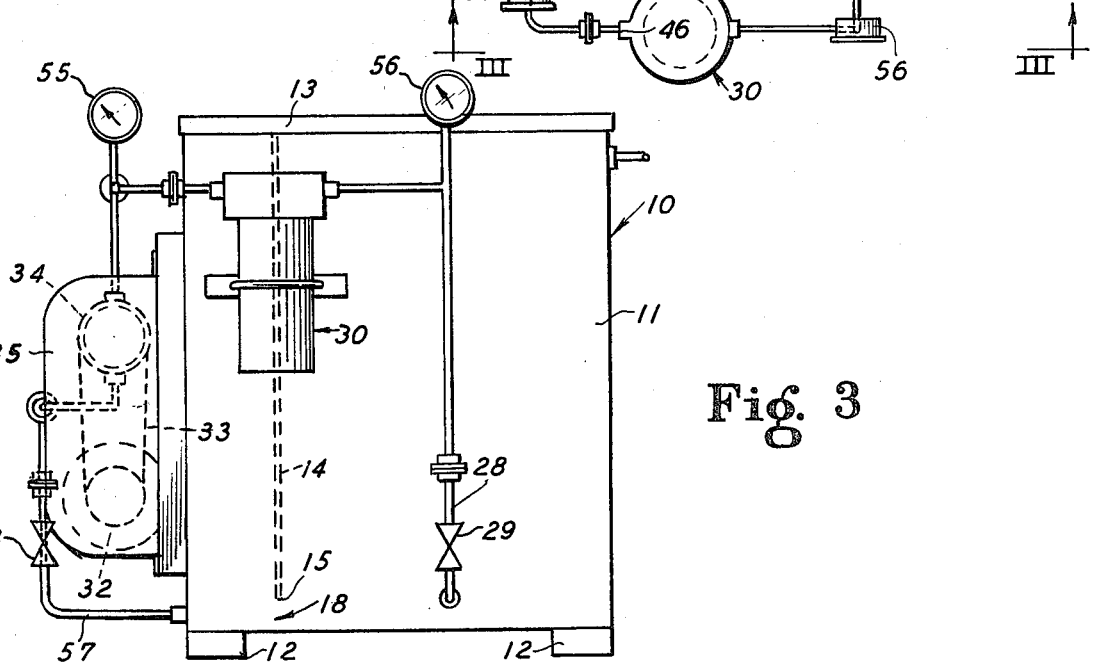
Fig. 3

LIQUID SEPARATING AND RECYCLING

FIELD OF THE INVENTION

This invention relates to the art of cleaning liquid emulsions and the like, separating the constituent liquids of the emulsions, and recycling the recovered liquids. Specifically, the invention deals with the removal of dirt and oil and the recycling of cleaning solutions from washers for oil laden parts and the like.

BACKGROUND OF THE INVENTION

Detergent solutions from parts washers, quenching baths, machine tools, and the like are contaminated with solids such as dirt, grit, scale and metal cuttings and with liquids such as tramp oil, and the like. Oil-laden solution emulsions are formed and it would be a considerable saving in energy and manufacturing costs if the solutions could be cleaned, freed of the tramp oil, and continuously recycled while at the same time recovering the oil constituent for re-use. It would be an improvement in the art to provide an inexpensive circulating system having a compact unit operated with a minimum energy input which will service parts washers, aqueous coolant and lubricant systems, quenching tanks, and the like industrial equipment to maintain the cleaning, cooling, or other solutions in a condition freed from contaminants and oil while at the same time recovering the oil for re-use. It would be a further improvement in the art, to provide an aqueous solution recovery system which maintains the integrity of the solutions, requires no added chemicals, no heat or cooling input, and is pre-piped for continuous recycling so that no altering or modification of the industrial equipment being serviced is needed.

SUMMARY OF THE INVENTION

According to this invention a relatively small container or tank is positioned adjacent to the industrial equipment to be serviced and receives the solutions to be treated from piping which can be mounted in the equipment by magnets thus avoiding structural changes in the equipment. The magnets hold the pipe closely adjacent an interior wall of the equipment in an out of the way position. A vertical baffle in the tank divides the interior into large and small compartments joined under the baffle. One or more fibrous filter bed coalescer units are mounted in the large compartment. An adjustable level over-flow outlet is provided in the top of each compartment. A pump, a driving motor for the pump, and a filter unit, preferably a bag filter, are mounted on the outside of the tank with piping which connects the magnet mounted inlet to flow the emulsified solution through the filter and coalescer filling the compartments with the contaminant-freed constituents of the solution where the lighter oil is allowed to rise to the top of the large compartment to be removed through the adjustable level outlet thereof while the heavier liquid settles to the bottom of the compartment, flows under the baffle, and rises to a level controlled by the adjustable level outlet in the small compartment from which it flows back to the industrial equipment. A column of oil is formed at the top of the large compartment and oil is drained from the top of this column to be recovered for re-use. The adjustable outlets are regulated to maintain the column of lighter oil in the large compartment above the level of the heavier solution in the small compartment. Circulation to and from the small tank is continuous so that the solution flows many times through the coalescer for effective de-emulsifying.

Piping and valving are also provided to raise the solution level for discharging the column of oil from the top of the large compartment and then draining the aqueous solution from the tank to accomodate replacement of the fibrous filters.

The coalescer units are preferably upright spools wound with strands or yarns of synthetic fiber effective to coalesce the emulsion into its constituent liquid phases. The spools have hollow perforated cores. The fibrous yarns form a porous bed which rapidly separates the emulsion into its constituent lighter and heavier phases permitting the oil to rise to the top of the surrounding pond while the heavy washing solution falls thereby providing a disperse phase at the top of the large compartment and a sedimentation phase under this disperse phase. The emulsion droplets possess an electric charge at their surface which is neutralized by the yarns, coalescing the droplets into larger sizes which will rise or "cream" to the top of the pond.

Fibrous disk-type coalescers are also useful.

In general, any fibrous bed coalescer effective to disperse tramp oil from water emulsions are useful. These emulsions are formed by washing oil coated industrial parts in detergent water solutions, by flowing aqueous coolants and lubricants over cutting tools and their work pieces, by quenching hot oil coated parts in aqueous quenching baths, and the like. The tramp oils combine with the aqueous solutions to form emulsions which heretofor had to be dumped causing severe pollution problems or de-emulsified in expensive cumbersome single pass systems.

It is then an object of this invention to provide a recovery and recycling system for industrial equipment such as parts washers, quenching baths, machine tool coolant and lubricant circulators and the like industrial equipment, which will remove entrained solid constituents, break up emulsions into disperse and sedimentation phases, continuously re-circulate the sedimentation phase back to the equipment and recover the disperse phase for re-use.

A further object of this invention is to provide an inexpensive, compact unit for removing dirt and tramp oil and recycling detergent cleaning solutions from parts washers and the like.

A specific object of this invention is to provide a self-contained compact recovery unit for aqueous solutions which is pre-piped for service with industrial equipment without modification of the equipment and operated by a low power motor to remove solid contaminants and tramp oil from the solutions, to recycle the aqueous constituents back to the equipment, and to recover the oil for re-use.

Another specific object of this invention is to provide a recovery unit for recycling cleaning solutions from industrial equipment adapted to be mounted in a small space adjacent the equipment and having an external motor driven pump, a contaminant filter, an internal fibrous bed oil coalescer and baffle separated compartments with a first compartment holding a pond of coalesced constituents of the emulsion to allow the dispersed oil phase to cream to the top of the pond and a second compartment receiving the sediment phase from the pond under the baffle together with adjustable top outlets for both compartments to respectively discharge the separated phases.

Another object of the invention is to provide a method of continuously circulating aqueous cleaning solutions through filters and coalescers to recycle used solutions freed from contaminants back to cleaning equipment.

A feature of the invention is the provision of adjustable level outlets for baffle separated compartments in a coalescer equipped tank to maintain a column of the disperse phase of an emulsion in one compartment at a level above a sedimentation phase which is continuously overflowed from the other compartment.

Other and further objects of this invention will become apparent to those skilled in this art from the following detailed description of the annexed sheets of drawings which, by way of example only illustrate a best mode of the invention.

ON THE DRAWINGS

FIG. 1 is a side elevational view of apparatus of this invention with its pre-piped attachment to the sump of an industrial parts washer;

FIG. 2 is a plan view of the apparatus of FIG. 1;

FIG. 3 is a side elevational view taken along the line III—III of FIG. 2;

AS SHOWN ON THE DRAWINGS

Figure 4:
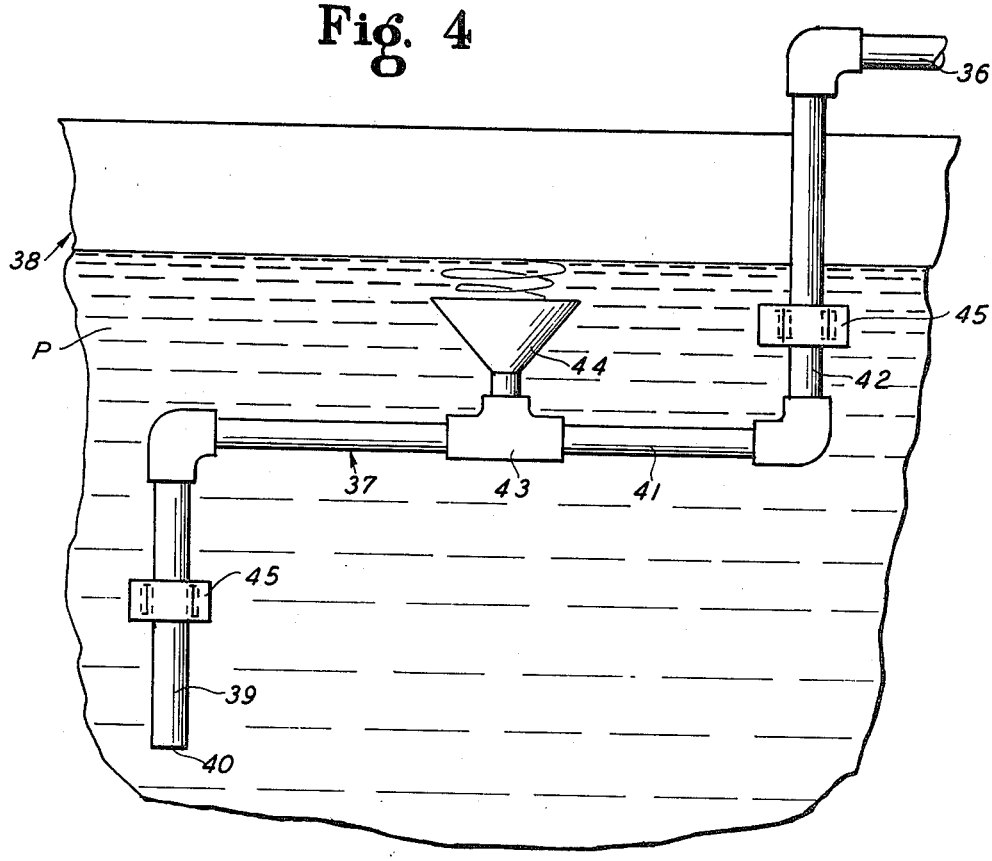
FIG. 4 is an elevational view of the vortex skimmer portion of the pre-piping immersed in the industrial equipment.

The recovery apparatus 10 of this invention includes an upright rectangular open top tank 11 formed of sheet metal, such as structural steel plates, preferably coated with a corrosion resisting enamel, and mounted on top of reinforcing skid feet 12, and having its open top closed by a cover or lid 13. The dimensions of the tank will vary depending upon the capacity of the equipment to be serviced but generally the tank will have a length of from 3 to 6 feet, a height of 3 to 4 feet, and a width of about 3 to 4 feet.

A vertical baffle 14 in the tank terminates at 15 above the bottom of the tank and divides the tank into a large compartment 16 and a small narrow compartment 17 communicating only at 18 under the bottom of the baffle 15. The large compartment 16 preferably has a length of 4 to 5 times the length of the narrow compartment 17.

One or more cylindrical fibrous bed coalescer units or cartridges 19 are mounted upright in the large compartment 16 above the bottom and below the top of the compartment. The drawing illustrates two such units 19 in side-by-side relation but it should be understood that any number of units can be used to satisfy operating conditions.

Each unit or cartridge 19 has a spool "S" formed with a hollow metal or plastics material core tube 20 perforated along its length with circumferentially and axially spaced square or rectangular holes 21 and carrying at its ends circular rims or flanges 22 which can be integral therewith or secured thereto.

Yarns or strands 23 of fibrous coalescing bed material are wound around the core to the full diameter of the end flanges or rims 22 providing a porous filter bed which will coalesce the disperse phase of an aqueous emulsion into larger droplets thus breaking up the emulsion into its separate liquid phases. The fibrous bed material has the individual yarns or strands wound in any desired pattern to maintain a myriad of flow paths through the bed which will intimately contact an emulsion flowing through the bed with the fibers which are wet by the oil phase and effect coalescing by electrokinetic absorption. The emulsified oil drops have negative charges as they flow through the bed and are contacted with the fiber yarns which have myriads of fuzzy like filament ends with positive electrostatic charges which neutralize the drops causing them to come together. At the fiber peaks they re-form as larger drops and separate as an oil or disperse phase.

Suitable synthetic fibers for the yarns include polypropylenes, nylons, polyesters, and blends thereof preferably coated with a phenolic resin. Suitable strands or yarns for the fibrous bed are available to the trade under the trademark "Kolar" from Albany Felt Company, Albany, N.Y. 12201. Other liquid/liquid separators or coalescers of the fibrous bed type and in the form of disks and sheets are available under the trademark "Zeta Plus" from AMF-Cuno Division, Meriden, Conn. 06450. In general, the coalescer units 19 will have the fibrous filter bed in the form of strands wound on spools, in the form of disks stacked on cores and the like cartridges, accommodating a continuous flow-through of the media being coalesced.

The spools "S" of the units 19 can be small in the order of 1½ to 2 feet high and 4 to 8 inches in diameter so that the units will be submerged in a settling pond S.P. of solution in the compartment 16. Since a single pass through the fibrous beds of the units 19 may be insufficient to completely coalesce all of the oil content sufficiently to permit all of the oil to rise to the top of the pond P, according to the invention a continuous circulation between the washer source and the tank 11 is maintained and the solution has many passes through the units 19.

Figure 5:
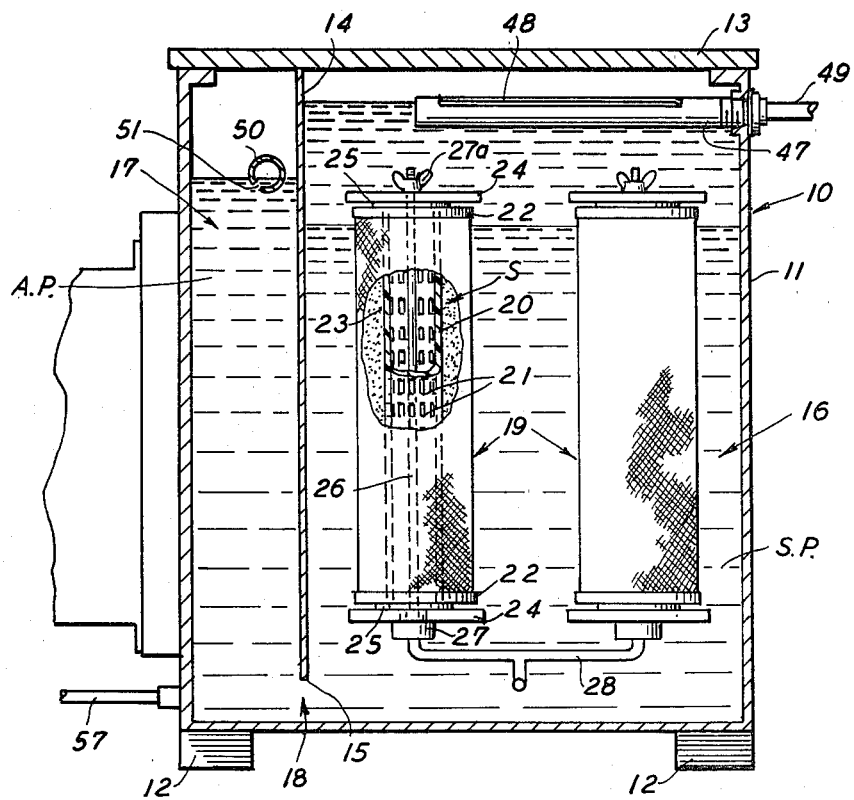
FIG. 5 is a vertical sectional view along the line V—V of FIG. 2.

As shown in FIG. 5, the units 19 have the end flanges 22 of each spool "S" covered with steel disks 24 with interposed gaskets or seal rings 25 sealing the hollow core open ends to the disks 24 and clamped in position by a spindle bolt 26 with a nipple head 27 on one end thereof and wing nut 27a threaded on the other end thereof. This arrangement permits quick and easy replacement of the spool. The nipple head 27 of each unit is connected to an inlet pipe 28 exiting from the bottom portion of the tank to a valve 29 controlling flow of filtered liquid from a bag filter 30 mounted exteriorly of the tank on the front wall thereof by means of a supporting bracket 31.

A side wall of the tank 11 mounts an electric motor 32 with reducing gear driving a belt 33 which in turn drives a superimposed pump 34 at relatively low speeds. A guard casing 35 surrounds the belt drive.

Piping 36 on the side of the tank 11 connects the intake of the pump 34 with a vortex skimmer inlet unit 37 which is conveniently held in an upright position on a side wall of a sump or collecting tank 38 receiving tramp oil laden aqueous cleaning solutions from industrial equipment such as parts washers. As best shown in FIG. 4, this vortex skimmer unit 37 has a vertical pipe portion 39 with a bottom inlet 40, and a horizontal pipe portion 41 joining the upper end of the pipe portion 39 with the lower end of an upstanding outlet pipe portion 42. A tee coupling 43 in the horizontal pipe portion 41 carries an upstanding open top cone shaped funnel 44. Permanent magnets 45 on the vertical pipe portions 39 and 42 mount the skimmer inlet 37 on the side wall of the sump or collecting tank 38 holding it closely adjacent the wall in an out-of-the-way position. The skimmer unit 37 is positioned in the tank or sump 38 at a level so that the bottom inlet opening 40 is close to the bottom of the sump or tank 38 and the open top of the funnel 44 is just below the surface of a pond "P" of the contaminated solution collected in the tank or sump.

The top of the pipe leg 42 is coupled to the pipe 36 to the inlet of the pump 34 and this pump 34 discharges through a pipe section 45 to the inlet 46 of the bag filter 30 thus pumping the solution from the pond P in the sump or collecting tank 38 with the funnel sucking any oil on top of the pond P into the inlet. The bag or bags in the filter unit 30 then filter out any solid contaminants and the filtered oil and aqueous emulsion is then forced through the tubing 28 and through the coalescers 19 forming the settling pond S.P. in the compartment 16. The coalesced oil droplets emerging from the coalescers 19 then rise or "cream" to the top of the pond S.P. where the oil is skimmed off through a slotted horizontal outlet pipe 47 which can be rotated to position the slot 48 thereof between top and bottom levels to control the height of the pond S.P. The oil is then drained from the pond through a top outlet 49.

The heavy sedimentation phase in the pond S.P. composed of the aqueous solution, flows through the bottom channel 18 under the baffle 14 into the narrow compartment 17 where it rises to form an aqueous solution pond A.P. at a level controlled by a horizontal outlet pipe 50 similar to the pipe 47 and having a slot 51 which can be positioned between the top and bottom of the pipe to control the level of the pond. The aqueous solution then flows by gravity through a pipe 52 back to the sump or collection tank 38.

Flow from the skimmer inlet to the inlet of the pump 34 is controlled by a valve 53 and flow from the pump to the inlet 46 of the filter unit 30 is controlled by a valve 54. As pointed out above, discharge from the filter unit 30, to the pipe 28 feeding the coalescers 19 is controlled by the valve 29.

Pressure indicators 55 and 56 upstream from the valves 53 and 54 on opposite sides of the filter 30 indicate the pressure drop across the filter thus showing the degree of clogging of the filter bag. An operating pressure drop of from 2 up to 50 pounds per square inch is satisfactory but when the pressure drop exceeds 50 pounds per square inch the bag of the filter should be replaced or cleaned.

A pipe 57 joins the bottom of the narrow compartment 17 of the tank 11 with the pump inlet pipe 36 and a valve 58 controls flow through this pipe 57.

A valve 60 in the return pipe 52 controls flow from the overflow outlet 50 back to the pond P in the sump 38.

A valve 61 controls flow from the pump outlet pipe 45 back to the return pipe 52 downstream from the valve 60.

As explained above, the valve 53 controls flow from the skimmer inlet 37 to the inlet pipe 36 of the pump 34 and the valve 29 controls flow from the bag filter 30 to the coalescers 19.

Figure 6:
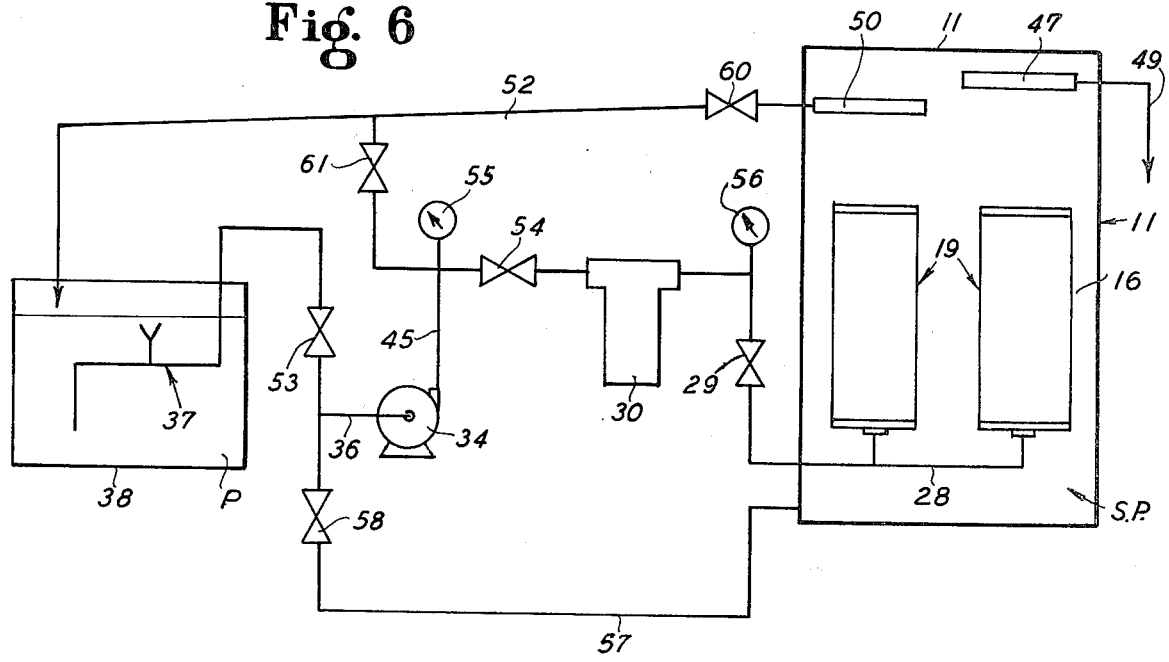
FIG. 6 is a flow diagram of the apparatus.

As shown in FIG. 6, the valving and piping arrangement is such that with the valves 29, 53, 54 and 60 open and with the valves 58 and 61 closed, the pump will flow liquid from the pond P through the filter unit 30 which removes the solid contaminants, and thence through the coalescers 19 into the pond S.P. where the coalesced oil droplets will rise to the top being removed through the overflow 47 while the heavier aqueous solution will flow under the baffle and rise through the narrow compartment to the overflow 50 for discharge through the pipe 52 back to the pond P.

When it is desired to replace or clean the filter 30 and the spools of the coalescer units 19, the valve 60 is closed with the valves 29, 53 and 54 remaining open and the valves 58 and 61 remaining closed. Then the pump 34 will continue to flow the liquid from the pond P through the bag filter and coalescers into the pond S.P. but since the return pipe 52 is closed, the level in the pond S.P. will rise to discharge the column of oil at the top of the pump through the outlet 47. When the oil column has been drained from the tank 11, the valves 29, 53 and 54, are closed, the valve 60 remains closed, and the valves 58 and 61 are opened whereupon a restarting of the pump 34 will flow the liquid from the bottom of the tank 11 back to the sump 38 draining the tank 11 through the pipe 57.

Figure 7:
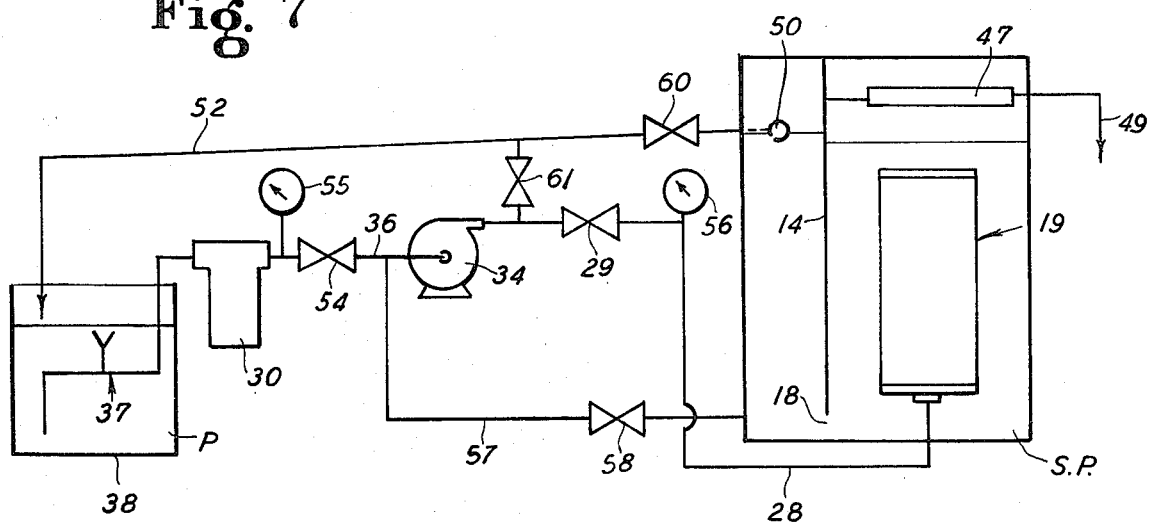
FIG. 7 is a modified flow diagram of the apparatus.

In the modified valving and piping arrangement of FIG. 7, the filter unit 30 is positioned ahead of the pump 34 in the inlet piping 36 and ahead of the valve 54. Then, with the valves 29, 54 and 60 opened, the pump will pull the liquid from the pond P through the filter 30 discharging the contaminant-free liquid through the pipe 28 and coalescers such as 19 into the pond S.P. with the oil overflowing through the outlet 47 and the aqueous portion of the liquid flowing back to the pond P through the pipe 52. When it is desired to clean or replace the spool of the coalescer unit such as 19, the valve 60 is closed and the level of the pond S.P. is allowed to raise to discharge the oil column through the over-flow outlet 46. Then the valves 29 and 54 are closed, the valves 58 and 61 are opened and the pump 34 will drain the remaining liquid in the tank back to the pond P.

The pipes and valves may be pre-mounted on the side walls of the tank 11 so that it is only necessary to couple the skimmer inlet unit 37 of FIG. 4 to the inlet pipe 36 and to connect the outlet pipe 52 back to the collecting chamber or sump 38.

It will therefore be understood by those skilled in the art from the above descriptions and the drawings filed herewith that the recovery units of this invention are compact, self-contained, easily installed without modifications of existing industrial equipment, and operate with a very low power input requirement. In preferred installations, the filter of the recovery unit is a cloth bag which will retain particles over 10 microns, will operate efficiently with up to a 50 pound pressure drop. The pump of the unit can be set to deliver a relatively low flow rate of, for example, four gallons per minute and since the liquid is continuously recirculated, the coalescers need not be as large and cumbersome as required in single pass de-emulsifying equipment. The level height of oil is easily controlled by the adjustable outlets for the respective compartments and a high level column permits maximum "creaming" time to increase the purity of the discharged oil.

It will also be understood that the emulsions treated by the recovery units of this invention are formed, for example, by thermal shock as in quenching or spraying hot oil coated parts, by detergents in cleaning solutions and by agitation in the circulation of cooling lubricants through machine tools. The solid contaminants most frequently encountered include dirt, metal removed from the parts being washed, oxides, carbon, and the like.

We claim as our invention:

1. Apparatus for recovering reusable constituents of contaminated liquid emulsions while continuously recycling at least one of the constituents which comprises, a skimmer assembly for immersion in a pond of contaminated liquid emulsion, said assembly including a pipe having a bottom inlet, a top outlet, an open top skimmer inlet between the bottom inlet and top outlet at a level above the bottom inlet, means for holding said skimmer assembly in the pond at a level positioning the bottom inlet near the bottom of the pond and the open top skimmer inlet near the top of the pond to suck liquid therefrom, a tank, a baffle terminating above the bottom of the tank dividing the tank into large and small compartments joined below the baffle, a fibrous bed coalescer in said large compartment, a filter, a pump including conduit means for flowing liquid from the top outlet of said skimmer assembly pipe through said filter and coalescer into said large compartment, an oil overflow outlet in the upper portion of said large compartment, a heavier liquid overflow outlet in said small compartment at a level below said oil overflow outlet, means for adjusting at least one of said overflow outlets to maintain a column of lighter liquid rising to the top of said large compartment at a level above the liquid in said small compartment, and a pipe joining the heavier liquid overflow outlet with said pond to continuously return liquid to the pond.

2. The apparatus of claim 1 wherein the tank is rectangular, has an open top closed by a lid, and the fibrous bed coalescer includes a plurality of upstanding cartridges with spools having hollow perforated cores surrounded by a synthetic fiber yarn wound around the core.

3. The apparatus of claim 1 wherein the oil and heavier liquid overflow outlets are rotatable horizontal pipes with longitudinal slots shifted between the tops and bottoms of the pipes as the pipes are rotated to control the level of ponds in the compartments.

4. The apparatus of claim 1 wherein the coalescer includes a hollow perforated core spool wound with a synthetic plastics material yarn forming the fibrous bed.

5. The apparatus of claim 4 wherein the spool is mounted on a support base by a spindle bolt extending through the core and a nut on the spindle bolt clamps the spool to the base.

6. The apparatus of claim 1 wherein the means for holding the skimmer assembly in the pond are magnets.

7. A single tank apparatus for removing dirt and oil and recycling cleaning solutions from parts washers and the like which comprises an open top tank, a cover for said tank, an upstanding baffle in the tank dividing the tank into side by side first and second compartments communicating at the bottom, a coalescer unit in the first compartment, a first adjustable level outlet at the top of said first compartment, a second adjustable level outlet at the top of said second compartment at a level below said first outlet, a filter mounted on the tank, an electric motor driven pump mounted on the tank, piping having an inlet for receiving solutions to be treated to convey the solutions through the pump, filter and coalescer unit into said first compartment to separate oil from the solution and to fill both compartments, additional piping connecting the adjustable level outlet of said second compartment back to the solution source of said piping inlet for maintaining the level of the solution in the second compartment below the level of a column of separated oil on the solution in the first compartment, a drain for the second adjustable level outlet, and further piping connecting the bottom of the tank with the pump inlet.

8. The apparatus of claim 7 wherein valves in the piping control flow to effect a continuous flow through the coalescer unit with recirculation back to the parts washer, a cessation of flow back to the parts washer to raise the level of the pond in the said first compartment, and a draining of the tank.

9. The apparatus of claim 7 wherein the coalescer unit has an upstanding removeable spool wound with a yarn of synthetic plastics material forming a bed effective to coalesce small drops of oil into larger drops which will rise to the top of a pond in said one compartment.

10. A recovery and recycling unit for positioning adjacent parts washers and the like to receive contaminated aqueous detergent solutions for removing the contaminants, separating tramp oil from the solutions and recycling the solutions back to the washer which comprises, an open top tank, a lid closing the open top of the tank, an upstanding baffle in the tank terminating above the bottom thereof dividing the tank into narrow and wide compartments in side by side relation and communicating at the bottom under the baffle, a first adjustable level outlet for the top of said wide compartment, a second adjustable level outlet for the top of said narrow compartment at a level below said outlet for the wide compartment, upstanding coalescer cartridges in the wide compartment, a filter mounted on the tank, a motor driven pump mounted on the tank, and valved piping for circulating the solution from the parts washer through the pump, filter and coalescer cartridges into the wide compartment to separate oil from the solution and fill both compartments to their adjustable level outlets with a column of separated oil on the solution in the wide compartment, additional piping flowing solution from the adjustable level outlet of the narrow compartment back to the parts washer, and a drain for the adjustable level outlet of said wide compartment.

11. The unit of claim 10 wherein the valved piping is mounted on the outside of the tank.

12. The unit of claim 10 wherein the valved piping also drains the tank back to the washer.

13. The unit of claim 10 wherein the valved piping and the motor driven pump maintain a low volume circulation of the solutions.

14. The method of removing dirt and tramp oil from aqueous detergent solutions from industrial equipment which comprises, collecting a pond of used dirt and oil laden detergent solution, pumping solution from the bottom of the pond, simultaneously sucking solution from just below the top of the pond, filtering solid contaminants from the pumped solution, flowing the filtered solution through a coalescer unit into a surrounding pond, flowing solution from the bottom of said surrounding pond into the bottom of a second pond in side by side relation with said surrounding pond, allowing coalesced oil to rise to the top of the surrounding pond, forming a column of said coalesced oil at the top of said surrounding pond, draining the oil from the top of said column of the surrounding pond, controlling the level of said ponds to maintain a column of oil in said surrounding pond above the top level of the second pond, and continuously recirculating solution from the top of the second pond back to the collecting pond.

15. The method of claim 14 wherein the continuous circulation is maintained at a slow flow rate without input of heat or cooling energy.

16. The method of removing in a tank dirt and tramp oil from used cleaning solutions from parts washers and the like industrial equipment which comprises, continuously circulating the used solutions through a filter mounted on the tank to remove solid contaminants and a coalescer in the tank to separate emulsified oil from the aqueous constituent of the solution, forming a first pond of the coalesced solution in the tank surrounding the coalescer, allowing oil to rise to the top of the first pond, flowing the aqueous solution from the bottom of the first pond upwardly through a second pond in the tank alongside the first pond, continuously returning the solution from the top of the second pond back to the source of the solution, controlling and maintaining the level of the second pond below the level of the first pond, collecting a column of oil in the first pond above the level of the second pond, and draining oil from the top of said column.

17. The method of claim 16 which includes maintaining said continuous circulation with a single pump.

18. The method of claim 16 wherein the continuous circulation is maintained at a slow flow rate.

* * * * *